(12) United States Patent
Aiba et al.

(10) Patent No.: US 12,107,703 B2
(45) Date of Patent: Oct. 1, 2024

(54) DETERMINATION DEVICE, DETERMINATION PROGRAM, AND DETERMINATION METHOD

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Shinichi Aiba, Yokkaichi (JP); Hiroshi Ueda, Yokkaichi (JP); Naoki Adachi, Yokkaichi (JP); Shogo Kamiguchi, Yokkaichi (JP); Fumiya Ishikawa, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

(*) Notice: Subject to any disclaimer, the term of this patent is extended or adjusted under 35 U.S.C. 154(b) by 165 days.

(21) Appl. No.: 17/756,927
(22) PCT Filed: Nov. 17, 2020
(86) PCT No.: PCT/JP2020/042793
§ 371 (c)(1),
(2) Date: Jun. 6, 2022
(87) PCT Pub. No.: WO2021/111865
PCT Pub. Date: Jun. 10, 2021

(65) Prior Publication Data
US 2023/0006860 A1    Jan. 5, 2023

(30) Foreign Application Priority Data
Dec. 6, 2019 (JP) .................. 2019-221517

(51) Int. Cl.
*H04L 12/40* (2006.01)
*B60R 16/023* (2006.01)
(52) U.S. Cl.
CPC .... *H04L 12/40013* (2013.01); *B60R 16/0231* (2013.01); *H04L 2012/40215* (2013.01); *H04L 2012/40273* (2013.01)

(58) Field of Classification Search
CPC ..... H04L 12/40013; H04L 2012/40215; H04L 2012/40273; H04L 12/12; B60R 16/0231
See application file for complete search history.

(56) References Cited

U.S. PATENT DOCUMENTS

2015/0066239 A1   3/2015  Mabuchi
2018/0302422 A1*  10/2018 Kishikawa ............ H04L 9/3271

FOREIGN PATENT DOCUMENTS

WO    2019-117184 A1    6/2019

OTHER PUBLICATIONS

International Search Report, Application No. PCT/JP2020/042793, mailed Feb. 16, 2021. ISA/Japan Patent Office.

* cited by examiner

*Primary Examiner* — Jacob M Amick
*Assistant Examiner* — Charles J Brauch
(74) *Attorney, Agent, or Firm* — Honigman LLP

(57) ABSTRACT

A control unit of a determination device obtains a plurality of pieces of first data and second data, derives determination data based on the first data, specifies, from among a plurality of combinations of identifiers for respectively identifying the pieces of first data and an identifier for identifying the second data, based on the second data and the determination data, a valid combination including the identifiers of valid first data and second data, and an invalid combination including the identifiers of invalid first data or second data, and determines, based on a plurality of identifiers included in the specified invalid combination and a plurality of identifiers included in the valid combination, whether the first data or the second data is invalid.

10 Claims, 6 Drawing Sheets

FIG. 4

Identifier combination table 211

| Combination No. | Second identifier (protected CAN-ID) | First identifier (associated CAN-ID) | Absolute value of correlation coefficient | Comparison results of second identifier data and determination data |
|---|---|---|---|---|
| 1 | 100 | 120 | 0.xxxxxxxxx | Invalid combination due to being different from determination data => first or second identifier is invalid |
|   |   | 130 | 0.xxxxxxxxx |   |
|   |   | 140 | 0.xxxxxxxxx |   |
| 2 | 110 | 100 | 0.xxxxxxxxx | Invalid combination due to being different from determination data => first or second identifier is invalid |
|   |   | 150 | 0.xxxxxxxxx |   |
| 3 | 120 | 100 | 0.xxxxxxxxx | Invalid combination due to being different from determination data => first or second identifier is invalid |
|   |   | 160 | 0.xxxxxxxxx |   |
|   |   | 170 | 0.xxxxxxxxx |   |
| 4 | 130 | 120 | 0.xxxxxxxxx | Invalid combination due to being different from determination data => first or second identifier is invalid |
|   |   | 140 | 0.xxxxxxxxx |   |
| 5 | 140 | 110 | 0.xxxxxxxxx | Invalid combination due to being different from determination data => first or second identifier is invalid |
|   |   | 150 | 0.xxxxxxxxx |   |
|   |   | 160 | 0.xxxxxxxxx |   |
| 6 | 150 | 120 | 0.xxxxxxxxx | Valid combination due to matching determination data => first and second identifiers are valid |
|   |   | 130 | 0.xxxxxxxxx |   |
| 7 | 160 | 100 | 0.xxxxxxxxx | Invalid combination due to being different from determination data => first or second identifier is invalid |
|   |   | 170 | 0.xxxxxxxxx |   |
| 8 | 170 | 110 | 0.xxxxxxxxx | Invalid combination due to being different from determination data => first or second identifier is invalid |
|   |   | 140 | 0.xxxxxxxxx |   |

DETERMINATION DEVICE, DETERMINATION PROGRAM, AND DETERMINATION METHOD

CROSS-REFERENCE TO RELATED APPLICATIONS

This application is the U.S. national stage of PCT/JP2020/042793 filed on Nov. 17, 2020, which claims priority of Japanese Patent Application No. JP 2019-221517 filed on Dec. 6, 2019, the contents of which are incorporated herein.

TECHNICAL FIELD

The present disclosure relates to a determination device, a determination program, and a determination method.

BACKGROUND

Conventionally, the CAN communication protocol is broadly used in communication between a plurality of vehicle-mounted ECUs (Electronic Control Units) mounted in vehicles. In accordance with an increase in functionalities and sophistication of vehicles, the number of vehicle-mounted ECUs mounted in the vehicles tends to increase. The vehicle-mounted ECUs are divided into groups (segments) to form a vehicle network, the plurality of vehicle-mounted ECUs in the same group are connected by a common communication line and performs transmission/reception of data among each other, and transmission/reception of data between the vehicle-mounted ECUs of different groups are relayed by a vehicle-mounted relay device (gateway) (e.g., JP 2013-131907A).

The vehicle network described in JP 2013-131907A includes, in addition to a vehicle-mounted relay device (gateway), a vehicle network monitoring device that is connected to segments of the vehicle network and detects invalid data (messages) that is present in the vehicle network. When detecting invalid data (messages), the vehicle network monitoring device transmits warning information (message codes) to vehicle-mounted control devices (vehicle-mounted ECUs).

The vehicle network monitoring device described in JP 2013-131907A gives no consideration to determination of data that has become invalid due to an attack when any of a plurality of pieces of data that are associated with each other is subjected to an attack.

SUMMARY

An object of the present disclosure is to provide a determination device and the like, with which data that has become invalid due to an attack can be determined when any of a plurality of pieces of data associated with each other has been subjected to an attack.

A determination device according to an aspect of the present disclosure is a determination device that is mounted in a vehicle and connected to a plurality of vehicle-mounted ECUs so that they can communicate with the determination device, the determination device including a control unit configured to perform control regarding determination of whether data transmitted from the plurality of vehicle-mounted ECUs is valid, and the data includes first data and second data, and the control unit is configured to obtain a plurality of pieces of the first data and the second data that are transmitted from the plurality of vehicle-mounted ECUs, derives determination data based on the first data, and specify, from among a plurality of combinations of identifiers for identifying the first data and identifiers for identifying the second data, valid combinations including identifiers of valid first data and second data and invalid combinations including identifiers of invalid first data or second data, based on the second data and the determination data, and determine, based on the plurality of identifiers included in the specified invalid combinations and the plurality of identifiers included in the valid combinations, whether the first data or the second data of any identifier included in the specified invalid combinations is invalid.

Effects of the Present Disclosure

According to an aspect of the present disclosure, it is possible to provide a determination device and the like with which, data that has become invalid due to an attack is determined when any of a plurality of pieces of data associated with each other has been attacked.

BRIEF DESCRIPTION OF DRAWINGS

FIG. 4 is an illustrative diagram showing a plurality of combinations (combination table) of identifiers for identifying first data and second data.

DETAILED DESCRIPTION OF PREFERRED EMBODIMENTS

Figure 1:
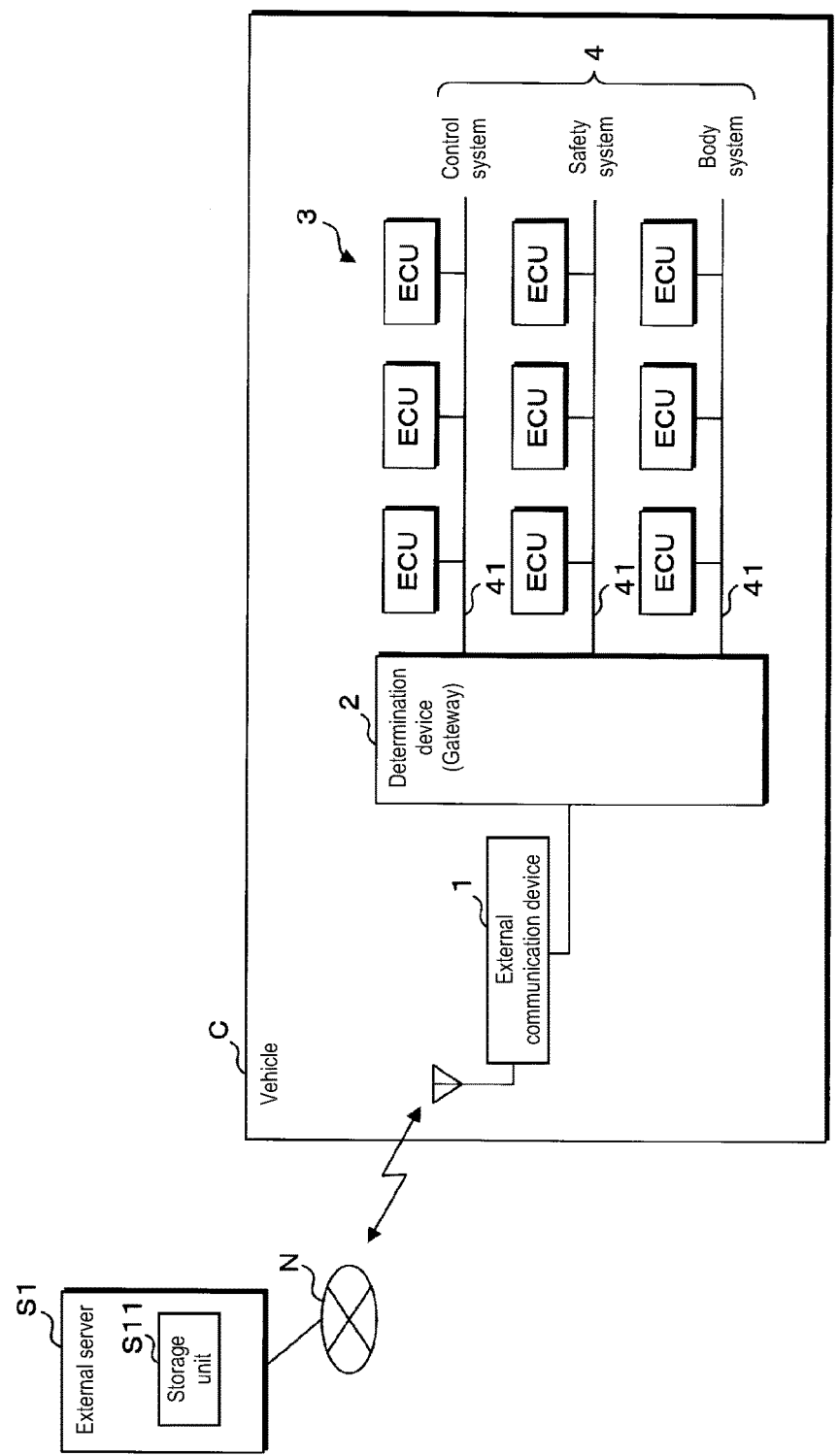
FIG. 1 is a schematic diagram showing an exemplary system configuration including a determination device according to a first embodiment.

First, aspects of the present disclosure will be listed and described. At least some of the embodiments described below may be combined as appropriate.

First Aspect

A determination device according to a first aspect of the present disclosure is a determination device that is mounted in a vehicle and connected to a plurality of vehicle-mounted ECUs so that they can communicate with the determination device, the determination device including a control unit configured to perform control regarding determination of whether data transmitted from the plurality of vehicle-mounted ECUs is valid, and the data includes first data and second data, and the control unit is configured to obtain a plurality of pieces of the first data and the second data that are transmitted from the plurality of vehicle-mounted ECUs, derives determination data based on the first data, and specify, from among a plurality of combinations of identifiers for identifying the first data and identifiers for identifying the second data, valid combinations including identifiers of valid first data and second data and invalid combinations including identifiers of invalid first data or second data, based on the second data and the determination data, and determine, based on the plurality of identifiers included in the specified invalid combinations and the plurality of identifiers included in the valid combinations, whether the first data or the second data of any identifier included in the specified invalid combinations is invalid.

With the first aspect, based on the first data, the second data, and the determination data, the determination device specifies, from among the plurality of combinations of identifiers for identifying a plurality of pieces of first data and second data, a valid combination including only identifiers of valid first data and valid second data, and an invalid combination including identifier of invalid first data or second data. Accordingly, the determination device can specify valid data from among the plurality of pieces of data associated with each other. Based on the first data or the second data of the identifier included in the invalid combination and the specified valid data (the first data and second data of the identifiers included in the valid combination), the determination device determines whether any of the first data and second data of the identifiers included in the invalid combinations is invalid. Accordingly, even when any of the plurality of pieces of data associated with each other is subjected to an attack, the data that has become invalid due to the attack can be specified.

Second Aspect

In the determination device according to a second aspect of the present disclosure, each of the plurality of combinations may also include a plurality of identifiers for respectively identifying a plurality of pieces of the first data and an identifier of the second data, and the same identifier may also be redundantly included in two or more of the combinations.

With the second aspect, the combinations are each constituted by a data set including a plurality of identifiers respectively indicating the plurality of pieces of first data and a single identifier of the second data, and the same identifier is redundantly included in two or more combinations. Accordingly these combinations can be linked and associated with each other based on any one of the identifiers, and determination of the first and second data of the identifiers included in the other combination can be efficiently performed using the identifiers of the first or second data included in the combination determined as the valid combination.

Third Aspect

In the determination device according to a third aspect of the present disclosure, if a difference between determination data derived based on first data with an identifier included in one of the plurality of combinations and second data with an identifier included in that one combination is within a predetermined value, then the control unit may also specify that the one combination is a valid combination.

With the third aspect, in the plurality of combinations, when the difference between the determination data derived based on the plurality of pieces of first data included in one combination and the second data included in that combination is within a predetermined value, the determination device specifies that the combination is the valid combination. Since whether the first and second data included in the combination is valid is determined for each combination in this manner, determination can be efficiently performed for each combination. The predetermined value means a threshold for determining that the determination data and the second data have substantially the same value with respect to the accuracy of determination processing performed by the determination device when comparing the determination data with the second data.

Fourth Aspect

In the determination device according to a fourth aspect of the present disclosure, if a difference between determination data derived based on the first data with an identifier included in one of the plurality of combinations and the second data with an identifier included in that one combination is greater than a predetermined value, the control unit may also specify that the one combination is an invalid combination.

With the fourth aspect, in the plurality of combinations, when the difference between the determination data derived based on the plurality of pieces of first data included in one combination and the second data included in that combination is greater than a predetermined value, the determination device specifies that the combination is the invalid combination. Since whether the first and second data included in the combination is valid or invalid is determined for each combination in this manner, determination can be efficiently performed for each combination.

Fifth Aspect

In the determination device according to a fifth aspect of the present disclosure, from among the identifiers included in the invalid combination, the control unit may also determine that the first data or the second data with an identifier that is different from the identifier included in the valid determination combination is invalid data.

With the fifth aspect, the first data and the second data of the identifiers included in the valid combination have already been determined as the valid data. By contrast, the first data or the second data of the identifier included in the invalid combination is assumed to be invalid data. In view of this, even when the data is the first data or the second data of the identifiers included in the invalid combination, the same data as the first data and the second data of the identifiers included in the valid combination can be determined to be the valid data. Accordingly, in the first data and the second data of the identifiers included in the invalid combination, by determining the data that is different from the first data or the second data of the identifiers included in the valid combination as the invalid data, it is possible to efficiently determine which of the data, from among the first data and the second data of the identifiers included in the invalid combination, is invalid.

Sixth Aspect

In the determination device according to a sixth aspect of the present disclosure, a configuration is also possible in which, in identifiers of the plurality of first data included in the invalid combinations, the control unit is configured to derive the determination data based on the first data with identifiers excluding any identifier of data determined as invalid in another invalid combination, and determine whether the first data and the second data included in the invalid combination is valid, based on the determination data and the second data with an identifier included in the invalid combination.

With the sixth aspect, in the plurality of pieces of first data of the identifiers that are included in one of the invalid combinations, the determination data is derived based on the first data excluding the identifier of the data determined as invalid in the other invalid combination. Then, the determination device determines whether the first data and the second data are valid based on the first data excluding the data determined as invalid, the determination data itself, and the second data of the identifier that is included in the invalid combination. Since the first data used for deriving the determination data is the first data excluding the identifiers of the data determined as invalid in the other invalid combination, it is likely that such first data is the valid data. Accordingly, based on the determination data derived using the first data excluding the data determined as invalid and the second data, whether the first and second data are valid can be efficiently determined.

Seventh Aspect

In the determination device according to a seventh aspect of the present disclosure, a configuration is also possible in which, information regarding a plurality of combinations is stored in a predetermined storage area which is accessible from the determination device, and the control unit obtains the information regarding the plurality of combinations by referencing the predetermined storage area.

With the seventh aspect, the information regarding the plurality of combinations is stored not only in the storage unit included in the determination device but also in a predetermined storage area that is accessible from the determination device, such as an external server connected to the determination device so that they can communicate with each other, and thus the information regarding the combinations can be efficiently obtained.

Eighth Aspect

In the determination device according to an eighth aspect of the present disclosure, the first data and the second data corresponding to the identifiers constituting the combination may also be correlated with each other, and an absolute value of a correlation coefficient of the first data and the second data may also be at least 0.7.

With the eighth aspect, the first data and the second data corresponding to the identifiers constituting the combination are correlated with each other, and by setting a predetermined value of the absolute value of the correlation coefficient between the first data and the second data to 0.7, it is possible to determine whether the date is valid using the second data of which the absolute value of the correlation coefficient with the first data is 0.7 or more, and improve the accuracy of the result of determination.

Ninth Aspect

A determination program according to a ninth aspect of the present disclosure is a determination program for causing a computer to execute processing for obtaining a plurality of pieces of the first data and the second data that are transmitted from the plurality of vehicle-mounted ECUs, deriving determination data based on the first data, obtaining information regarding a plurality of combination of identifiers for identifying the first data and second data, specifying, from among a plurality of combinations, valid combinations including identifiers of valid first data and second data and invalid combinations including identifiers of invalid first data or second data, based on the obtained second data and the determination data, and determining, based on the plurality of identifiers included in the specified invalid combinations and the plurality of identifiers included in the valid combinations, whether the first data or the second data of any identifier included in the specified invalid combinations is invalid.

With the ninth aspect, a computer can function as the determination device.

Tenth Aspect

A determination method according to a tenth aspect of the present disclosure is a determination method for causing a computer to execute processing for obtaining a plurality of pieces of the first data and the second data that are transmitted from the plurality of vehicle-mounted ECUs, deriving determination data based on the first data, obtaining information regarding a plurality of combination of identifiers for identifying the first data and second data, specifying, from among a plurality of combinations, valid combinations including identifiers of valid first data and second data and invalid combinations including identifiers of invalid first data or second data, based on the obtained second data and the determination data, and determining, based on the plurality of identifiers included in the specified invalid combination and the plurality of identifiers included in the valid combinations, whether the first data or the second data of any identifier included in the specified invalid combinations is invalid.

With the tenth aspect, a determination method can be provided, according to which when any of the plurality of pieces of data that are in association with each other is subjected to an attack, the data that has become invalid due to the attack can be determined.

In the following, the present disclosure will be described in detail with reference to the drawings showing embodiments thereof. A vehicle-mounted determination device 2 according to embodiments of the present disclosure will be described below with reference to the drawings. It should be noted that the present disclosure is not limited to these examples, but is defined by the claims, and is intended to include all modifications which fall within the scope of the claims and the meaning and scope of equivalents thereof.

First Embodiment

Figure 2:
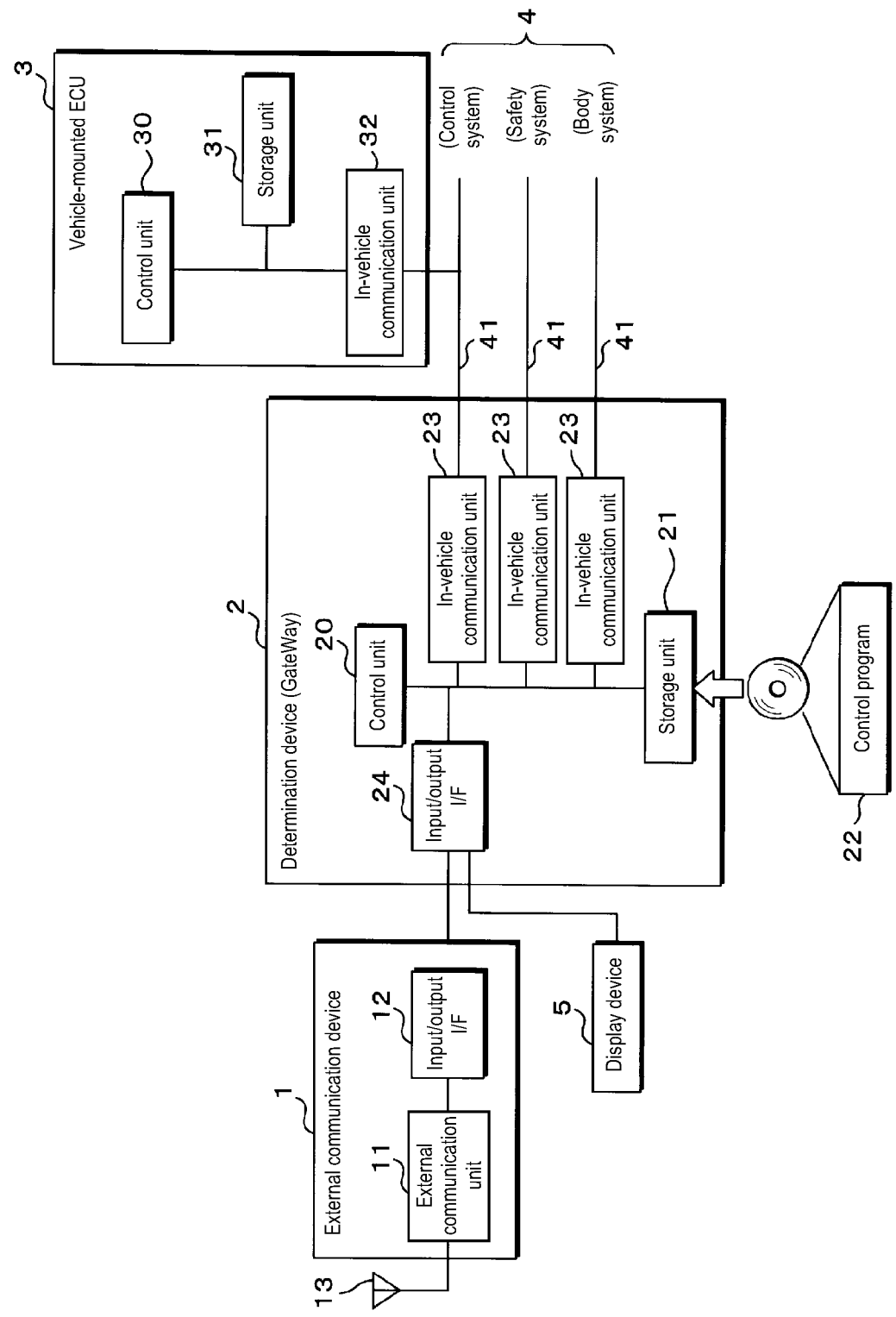
FIG. 2 is a block diagram showing an exemplary internal configuration of the determination device.

Hereinafter, an embodiment will be described with reference to the drawings. FIG. 1 is a schematic diagram showing an exemplary system configuration including the determination device 2 according to a first embodiment. FIG. 2 is a block diagram showing an exemplary internal configuration of the determination device 2 and the like. An external communication device 1, the determination device 2, and a plurality of vehicle-mounted ECUs 3 connected to the determination device 2 so that the vehicle-mounted ECUs 3 can communicate with the determination device 2, are mounted in a vehicle C.

The determination device 2 determines whether data such as a message that is output (transmitted) by these vehicle-mounted ECUs 3 is valid. The determination device 2 functions as a vehicle-mounted relay device such as a CAN gateway or an Ethernet switch (registered trademark) that relays data exchanged between these vehicle-mounted ECUs 3. Furthermore, the determination device 2 may also function as a vehicle-mounted relay device for communicating with an external server S1 (program providing device) connected to an external network N via the external communication device 1. The determination device 2 may also function as a reprogramming master that transmits programs or data obtained from the external server S1 to the vehicle-mounted ECUs 3 (Electronic Control Units) mounted in the vehicle C. The determination device 2 may also perform a series of determination processing (described later) in cooperation with the external server S1.

The external server S1 is, for example, a computer such as a server connected to the external network N, such as the Internet or a public network, and includes a storage unit S11 constituted by a RAM (Random Access Memory), a ROM (Read Only Memory), a hard disk or the like. A program and/or data for controlling the vehicle-mounted ECUs 3, created by the manufacturer of the vehicle-mounted ECUs 3 or the like, are stored in the storage unit S11 of the external server S1. The program or data may also be transmitted to the vehicle C as an update program and used for updating a program or data of the vehicle-mounted ECUs 3 mounted in the vehicle C. The external server S1 (program providing device) configured as above may also be referred to as an OTA (Over The Air) server. The vehicle-mounted ECUs 3 mounted in the vehicle obtain an update program transmitted from the external server S1 via wireless communication, and apply this update program as the program to be executed, and thus the vehicle-mounted ECUs 3 can update (reprogram) the program executed by themselves. Furthermore, a program or data for performing a series of determination processing in cooperation with the determination device 2 may also be stored in the storage unit S11 of the external server S1.

The external communication device 1, the determination device 2, a display device 5, and the plurality of vehicle-mounted ECUs 3 for controlling various vehicle-mounted devices are mounted in the vehicle C. The external communication device 1 is connected to the determination device 2 by a wire harness such as a serial cable so that they can communicate with each other. The determination device 2 and the vehicle-mounted ECUs 3 are connected via an in-vehicle LAN 4 compatible with a communication protocol such as CAN (Control Area Network/registered trademark) or TCP/IP so that they can communicate with each other.

The external communication device 1 includes an external communication unit 11 and an input/output I/F 12 for communicating with the determination device 2. The external communication unit 11 is a communication device for performing wireless communication using a mobile communication protocol such as 3G, LTE, 4G, or Wi-Fi, and exchanges data with the external server S1 via an antenna 13 connected to the external communication unit 11. The communication between the external communication device 1 and the external server S1 is performed via the external network, such as a public network or the Internet.

The input/output I/F 12 is a communication interface for performing, for example, serial communication with the determination device 2. The external communication device 1 and the determination device 2 communicate with each other via the input/output I/F 12 and a wire harness such as a serial cable connected to the input/output I/F 12. In the present embodiment, the external communication device 1 is a device that is separate from the determination device 2, and these devices are connected to each other via the input/output I/F 12 and the like so that they can communicate with each other. However, there is no limitation to this. The external communication device 1 may be built in the determination device 2 as a constituent part of the determination device 2.

The determination device 2 includes a control unit 20, a storage unit 21, in-vehicle communication units 23, and an input/output I/F 24. The determination device 2 is an vehicle-mounted relay device such as a gateway or an Ethernet switch that generally controls segments including a plurality of communication lines 41 (CAN buses, Ethernet (registered trademark) cables) of a plurality of systems such as the vehicle-mounted ECUs 3 of a control system, the vehicle-mounted ECUs 3 of a safety system, and the vehicle-mounted ECUs 3 of a body system, and that relays communication between the vehicle-mounted ECUs 3 between these segments. The determination device 2 may also be configured as a functional unit of a body ECU that performs overall control of the vehicle C. The determination device 2 may also be configured as a device separate from the vehicle-mounted relay device, and connected to the vehicle-mounted relay device so that they can communicate with each other. The determination device 2 may also be configured to obtain data such as messages and the like, that is output by the vehicle-mounted ECUs 3 via the vehicle-mounted relay device, and determine whether the data is valid.

The storage unit 21 is formed by a volatile memory device such as a RAM (Random Access Memory) or a nonvolatile memory device such as a ROM (Read Only Memory), an EEPROM (Electrically Erasable Programmable ROM), or a flash memory, and a control program and data that is referred to during processing are stored in advance in the storage unit 21. The control program stored in the storage unit 21 may be a control program read out from a recording medium 22 that can be read by the determination device 2. Alternatively, the control program may also be downloaded from an external computer (not shown) connected to a communication network (not shown), and be stored in the storage unit 21. Configuration information of all the vehicle-mounted ECUs 3 mounted in the vehicle C and relay path information (routing table) used for performing relay processing are stored in the storage unit 21. Further, information regarding a combination table (described later) is stored in the storage unit 21.

The in-vehicle communication units 23 are, for example, input/output interfaces (CAN transceivers) using a communication protocol such as CAN (Controller Area Network) or TCP/IP, and the control unit 20 communicates, via the in-vehicle communication unit 23, with the vehicle-mounted ECUs 3 connected to the in-vehicle communication unit LAN 4, or other vehicle-mounted devices such as a relay device. The plurality (three in the drawings) of the in-vehicle communication units 23 are provided, and the communication lines 41 constituting the in-vehicle LAN 4 are respectively connected to the in-vehicle communication units 23. By providing the plurality of in-vehicle communication units 23 in this manner, the in-vehicle LAN 4 is divided into a plurality of segments, and the vehicle-mounted ECUs 3 are connected to the segments according to the function (control system function, safety system function, or body system function) of the vehicle-mounted ECUs 3.

When the in-vehicle communication units 23 use the CAN communication protocol, the data obtained by the determination device from the vehicle-mounted ECUs is given as CAN messages. When the in-vehicle communication units 23 use the TCP/IP communication protocol, the data obtained by the determination device from the vehicle-mounted ECUs is given as IP packets.

The control unit 20 is formed by a CPU (Central Processing Unit) or an MPU (Micro Processing Unit) or the like, and is configured to perform various types of control processing and arithmetic processing or the like by reading out and executing a control program and data that are stored in advance in the storage unit 21. The control unit 20 is configured to receive data such as a message transmitted from the vehicle-mounted ECUs 3 respectively connected to the communication lines 41, or transmit data such as a message to the vehicle-mounted ECUs 3, and functions as a CAN controller, for example. Further, the control unit 20 references a message identifier such as a CAN-ID included in the received message, and specifies the in-vehicle communication unit 23 corresponding to the segment that is the transmission destination, based on the referenced message identifier (CAN-ID) and the route information (routing table) stored in the storage unit 21. The control unit 20 functions as a CAN gateway for relaying the message by transmitting the received message from the specified in-vehicle communication unit 23. The control unit 20 functions as a CAN controller, but there is no limitation to this. The in-vehicle communication units 23 may also function as a CAN transceiver and a CAN controller. Alternatively, the control unit 20 may also function as an Ethernet switch of a layer 2 or a layer 3 for receiving and performing relay processing on data such as IP packets transmitted from the vehicle-mounted ECUs 3.

The control unit 20 determines whether the data is valid by, for example, analyzing the data such as a message obtained (received) from the vehicle-mounted ECUs 3. In determination of whether the data is valid, "invalid data" means data such as a message transmitted from an invalid vehicle-mounted ECU 3 such as a vehicle-mounted ECU 3 that has entered an abnormal state due to a virus that has intruded from outside of the vehicle via the external communication device 1, or a vehicle-mounted ECU 3 that has been exchanged without authorization. Although details will be described later, the control unit 20 can determine whether the received data is valid by analyzing the data, and can determine a message transmitted from an invalid (abnormal) vehicle-mounted ECU 3 that mimics a valid (normal) vehicle-mounted ECU 3, or a vehicle-mounted ECU 3 that has become abnormal due to an attack from the outside, as an invalid message, for example. The control unit 20 specifies the identifier (e.g., message identifier of the CAN-ID or the like) included in the data of the message and the like that is determined to be invalid, and performs, for example, defensive processing such as prohibiting relay processing of any data including the specified identifier.

The vehicle-mounted ECUs 3 each include a control unit 30, a storage unit 31, and an in-vehicle communication unit 32. The storage unit 31 is formed by a volatile memory device such as a RAM (Random Access Memory), or a nonvolatile memory device such as a ROM (Read Only Memory), an EEPROM (Electrically Erasable Programmable ROM), or a flash memory and a program or data for the vehicle-mounted ECU 3 is stored in the storage unit 31.

The display device 5 is, for example, an HMI (Human Machine Interface) device such as a car navigation display. The display device 5 is connected to the input/output I/F 24 of the determination device 2 by a wire harness such as a serial cable so that they can communicate with each other. Data or information that is output from the control unit 20 of the determination device 2 via the input/output I/F 24 is displayed in the display device 5. As described above, if it is determined that the received message is an invalid message, the determination device 2 may also transmit information such as the identifier included in the invalid message to the display device 5 and cause the display device 5 to display this information. By causing the display device 5 to display the information, the determination device 2 can notify the detection of the invalid message to an operator of the vehicle C. The form of connection between the display device 5 and the determination device 2 is not limited to a connection via the input/output I/F 24 and the like. The display device 5 and the determination device 2 may also be connected to each other via the in-vehicle LAN 4.

Figure 3:
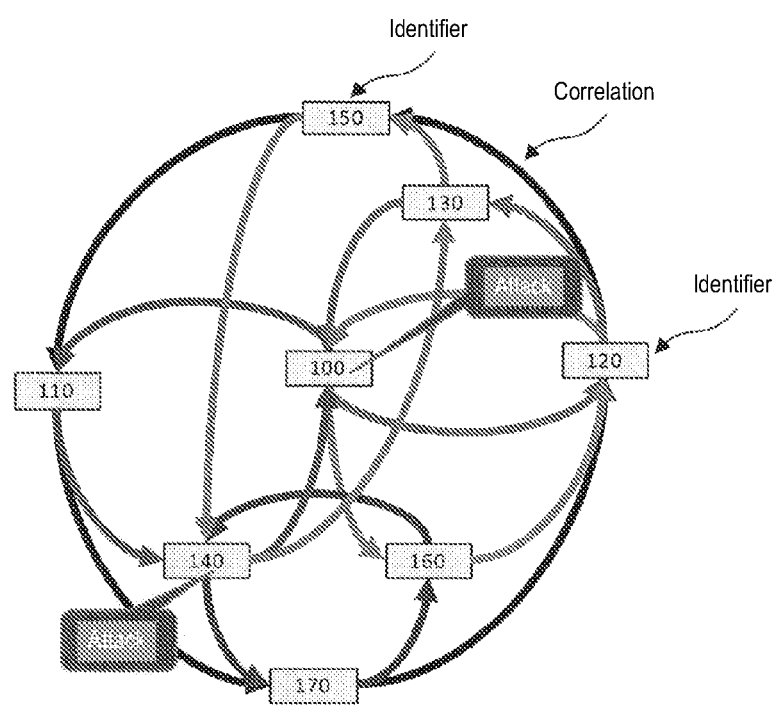
FIG. 3 is an illustrative diagram showing an exemplary correlation between a plurality of identifiers.

FIG. 3 is an illustrative diagram showing an exemplary correlation between a plurality of identifiers. FIG. 4 is an illustrative diagram relating to a plurality of combinations (combination table 211) of identifiers for identifying first data and second data.

Data that is output (transmitted) from the vehicle-mounted ECUs 3 includes identifiers for identifying the data. If the data that is output from the vehicle-mounted ECUs 3 is a CAN message, a message identifier (CAN-ID number) stored in the CAN-ID field included in the frame of the CAN message corresponds to the identifier. Data of a plurality of identifiers are correlated with each other. "Being correlated with each other" means that, in any two pieces of data with identifiers, the absolute value of the correlation coefficient of these pieces of data is at least a predetermined value. The correlation coefficient may also be calculated based on information relating to the value or content stored in the payloads of the CAN messages or the IP packets.

The predetermined value may be 0.7, for example, and by setting the predetermined value to 0.7, a plurality of pieces of data that have a state quantity with a relatively high correlation can be extracted from a group of data that is output from an obtaining unit 201. In order to improve the estimation accuracy, it is preferable that the predetermined value is set to 0.9. More preferably, the predetermined value is set to 0.97. The correlation coefficient can be calculated for example using the expression:

correlation coefficient=covariance of the value of the first data included in the plurality of pieces of data and the value of the second data that is other than the first data included in the plurality of pieces of data/(standard variation of the value of the first data×standard variation of the value of the second data)

By setting the absolute values of the correlation coefficients to a predetermined value or more, pieces of data that have a state quantity with a relatively high positive or negative correlation can be extracted. When the second data has a negative correlation with the first data, the correlation coefficient has a negative value. By multiplying −1 by this value, the value can be used as second data having a positive correlation.

The drawings in the present embodiment show an exemplary correlation between eight identifiers. In other words, in FIGS. 3 and 4, when the identifiers are CAN-IDs, a correlation between messages (data) with the CAN-IDs of 100, 110, 120, 130, 140, 150, 160, and 170 is illustrated. As shown in FIG. 3, a message of any identifier has a correlation with the messages of other identifiers. In other words, messages with the plurality of identifiers have a correlation with each other so that these messages are linked via other messages.

For example, the identifier with the CAN-ID of 170 has a correlation in which links are formed via other messages of at least two routes, namely, a route that returns to the same identifier (170) via 160, and 140, and a route that returns to the same identifier (170) via 120, 150, and 110. Accordingly, if any of the identifiers is subjected to an attack, using the relation with the other identifiers linked via the plurality of routes, it is possible to determine for which identifier the data is invalid data, and to specify any invalid identifiers.

FIG. 4 shows combinations of correlations between the plurality of identifiers in a table format (combination table 211). Note that, in FIG. 4, comments regarding whether the data with these identifiers (first identifiers or second identifier) included in these combinations is valid are given for each combination. Those comments will be described later.

The combination table 211 includes the items "combination No.", "plurality of first identifiers", and "second identifier", as the content items (meta data). Management numbers for specifying the combinations are stored in the item (field) called "combination No.". In the present embodiment, as an example, the eight identifiers (100, 110, 120, 130, 140, 150, 160, 170 and 180) constitute the eight combinations (No. 1 to No. 8) in the combination table 211. Thus, the number of combinations may be the same as the number of identifiers of the data to be determined. The identifiers (second identifiers) of the data to be compared with determination data (described later) are stored in the item (field) called "second identifier". The identifiers (first identifiers) of the data which has a correlation with the data of the second identifiers are stored in the item (field) called "first identifier". The data including the first identifiers is data used to derive determination data to be compared with the data of the second identifier.

As described above, a message with any identifier has a correlation with messages with other identifiers, and as illustrated in the combination table 211, all identifiers are each included in at least two combinations. For example, the identifier with the CAN-ID of 100 is included in the combination No. 1 as the second identifier, and included in the combinations 1, 2, and 7 as the first identifier. In other words, the combinations of the identifiers are each constituted by a dataset formed by a plurality of identifiers respectively indicating a plurality of pieces of first data and a single identifier of second data. On that basis, the combinations are configured so that the same identifier is redundantly included in at least two combinations.

The combination table 211 may also further include the absolute values of the correlation coefficients between the first identifiers and the second identifiers. The correlation coefficients or the absolute values of the correlation coefficients between the corresponding first identifiers and the second identifiers are stored in the item (field) called "absolute value of correlation coefficient".

Although the present embodiment describes that the identifier for identifying the data is a message identifier given by the CAN-ID, there is no limitation to this. If the communication protocol used by the vehicle-mounted ECUs 3 and the determination device 2 is TCP/IP, for example, the identifier for identifying the data may also be the transmission source address, the transmission destination address or the port number that are included in the IP packet, or a combination of any of these.

Figure 5:
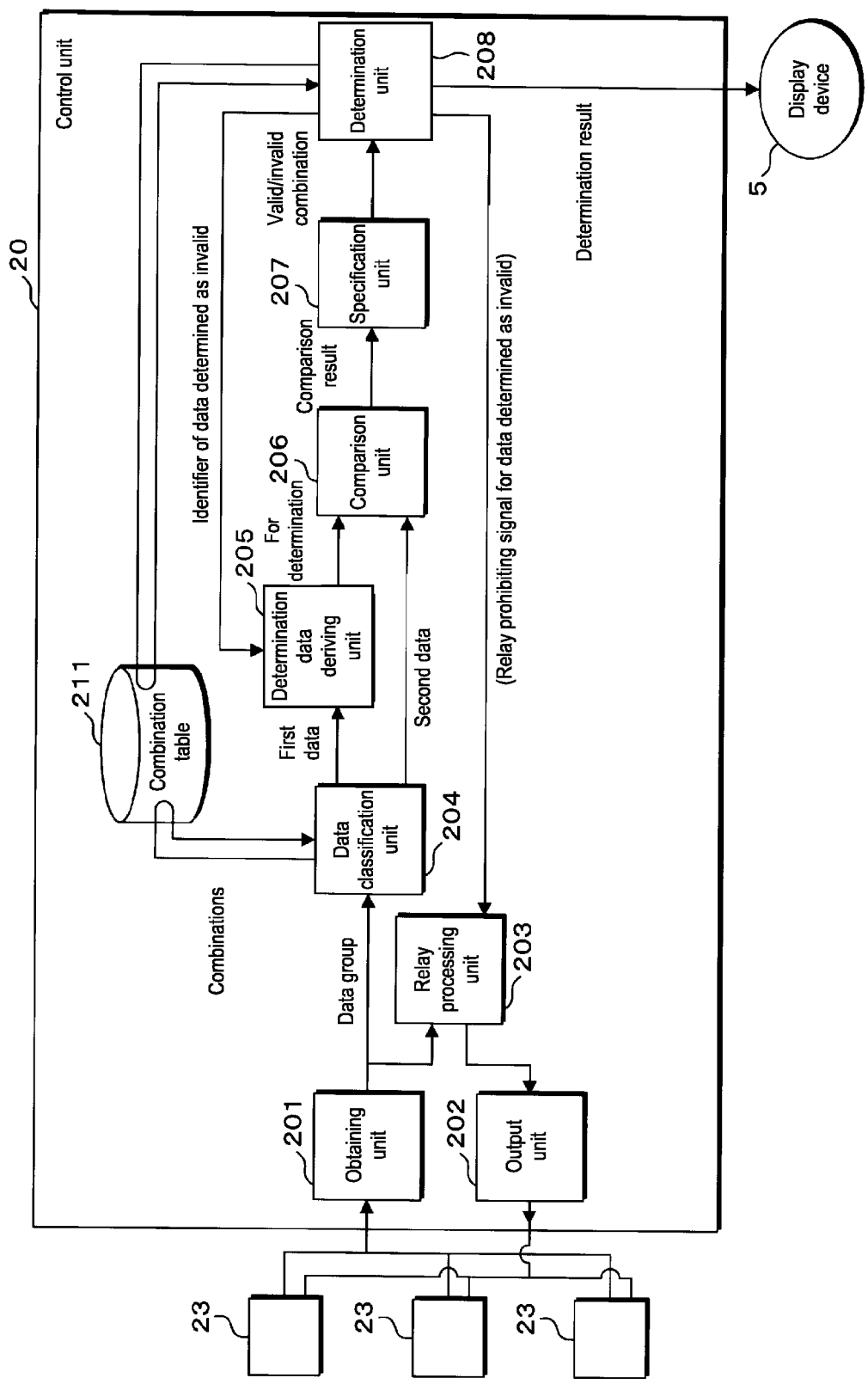
FIG. 5 is a functional block diagram showing exemplary functional units included in a control unit of the determination device.

FIG. 5 is a functional block diagram illustrating functional units included in the control unit 20 of the determination device 2. By executing the control program stored in the storage unit 21, the control unit 20 of the vehicle-mounted determination device 2 functions as the obtaining unit 201, an output unit 202, and a relay processing unit 203. Further, by executing the control program stored in the storage unit 21, the control unit 20 of the vehicle-mounted determination device 2 functions as a data classification unit 204, a determination data deriving unit 205, a comparison unit 206, a specification unit 207, and a determination unit 208, determines whether the obtained data is valid, and specifies valid identifiers and invalid identifiers in the identifiers included in the data.

The obtaining unit 201 obtains a plurality of pieces of data such as messages and the like that are output (transmitted) from the vehicle-mounted ECUs 3 via the in-vehicle communication unit 23. The obtaining unit 201 outputs the obtained data to the relay processing unit 203 and the data classification unit 204.

By referencing the route information stored in the storage unit 21, the relay processing unit 203 specifies the in-vehicle communication unit 23 that is the relay destination of the data, based on the CAN-ID included in data such as the obtained message and the like, or the transmission address, and outputs the data to the output unit 202.

The output unit 202 outputs the data that is output from the relay processing unit 203 via the in-vehicle communication unit 23 that is specified as the relay destination, and data relay processing is performed by the obtaining unit 201, the relay processing unit 203, and the output unit 202.

The data classification unit 204 obtains a plurality of pieces of data such as messages that are output (transmitted) from the vehicle-mounted ECUs 3 via the obtaining unit 201. By referencing the combination table 211 stored in the storage unit 21, the data classification unit 204 classifies the obtained pieces of data into data including the first identifiers (first data) and data including the second identifier (second data) for each combination, based on the first identifiers and second identifier included in each combination. As described above, the data classification unit 204 uses the CAN-IDs included in the CAN messages or the transmission addresses included in the IP packets as the identifiers (first or second identifiers), for example. In this manner, by using the CAN-IDs (CAN messages), transmission destination addresses (IP packets) or the like that are used in relay processing as the identifiers for identifying the data, identification of the data can be performed as processing accompanying relay processing, and an increase in processing load of the determination device 2 can be suppressed.

The data classification unit 204 performs the classification (categorization) of the first data and the second data for each combination. In other words, the data classification unit 204 generates a data set constituted by a plurality of pieces of first data and the second data for each combination.

The data classification unit 204 outputs the plurality of pieces of first data with the first identifiers included in a combination (one combination) to the determination data deriving unit 205, and outputs the second data with the second identifier included in the combination (the one combination) to the comparison unit 206. In other words, the data classification unit 204 sequentially or successively repeats processing times of the number of the plurality of combinations, in which the classification unit 204 outputs, to the determination data deriving unit 205, the first data with the first identifiers included in the one combination, and outputs, to the comparison unit 206, the second data with the second identifier included in the one combination.

The determination data deriving unit 205 derives the determination data, based on the first data for each combination that is output from the data classification unit 204. That is, by using a transformation function that outputs the determination data as an output value using each of the pieces of first data with the first identifiers (120, 130, 140) included in the combination No. 1 as an input value, the determination data deriving unit 205 derives the determination data corresponding to the second data including the second identifier (100) included in the combination No. 1. Alternatively, the determination data deriving unit 205 may also be constituted by a learning model such as a DNN (deep neural network) that has been trained to output the determination data in response to input of a plurality of pieces of first data, for example. The determination data deriving unit 205 may also include a learning model such as the DNN, and derive the determination data by inputting a plurality of pieces of first data to the learning model and obtaining the determination data output from the learning model. In this manner, the first data with the first identifier and the second data with the second identifier that are correlated with each other are in a correspondence relationship with respect to the determination data. When the second identifier is a protected CAN-ID to be protected from an attack, the first identifier corresponds to an associated CAN-ID that is associated with the second identifier in assuming the data with the second identifier. The determination data deriving unit 205 outputs the derived determination data to the comparison unit 206.

The comparison unit 206 compares the determination data obtained from the determination data deriving unit 205 with the second data that is output from the data classification unit 204, for all the combinations. The comparison unit 206 outputs, to the specification unit 207, information regarding the difference, such as whether the determination data matches the second data, or whether the difference between the determination data and the second data is within a predetermined value, as the comparison result.

If the difference between the determination data and the second data is within a predetermined value, such as in the case where the determination data matches the second data, the specification unit 207 determines that the plurality of pieces of first data, that are the source data of the determination data, and the second data are valid (normal) data, and specifies the combination including the first identifiers of the first data and the second identifier of the second data as a valid combination. A predetermined value is a threshold for determining that the determination data and the second data have substantially the same value with respect to the accuracy of determination processing performed by the determination device 2, when comparing the determination data with the second data.

If the difference between the determination data and the second data is greater than a predetermined value, such as in the case where the determination data and the second data do not match, the specification unit 207 determines that the plurality of pieces of first data that are source data of the determination data, and the second data are invalid (abnormal) data, and specifies the combination including the first identifiers of the first data and the second identifier of the second data as an invalid combination. The specification unit 207 outputs, to the determination unit 208, the specification result for each combination, that is, the result of specifying whether each of the combinations is a valid combination or an invalid combination.

The determination unit 208 obtains the specification result for each of the combinations that are output from the specification unit 207. By referencing the combination table 211, the determination unit 208 obtains the information regarding the first identifiers and the second identifier included in each of the combinations. The determination unit 208 determines that the first identifiers and the second identifier included in the valid combination are valid (normal) identifiers and the data including the identifiers is valid (normal) data.

As illustrated in FIG. 3 of the present embodiment, for example, if data of the identifiers 100 and 140 have been subjected to an attack and have become invalid data, the difference between the determination data and the second data falls within a predetermined value in the combination No. 6 that does not include the identifiers (100, 140) of the invalid data. In other words, the data with the first identifiers (120, 130) and the second identifier (150) included in the combination No. 6 are determined to be valid (normal) data.

In contrast, in the other combinations (No. 1, 2, 3, 4, 5, 7, and 8) that include the identifiers 100 and 140 as the first identifier or the second identifier, the difference between the determination data and the second data is greater than a predetermined value, and the data with the first identifier and the second identifier are determined to be invalid (abnormal) data. As described above, these other combinations are specified as invalid combinations.

Regarding the first identifiers and the second identifiers included in the invalid combinations, if, as a result of excluding the identifiers already determined as valid (normal) as the first identifiers and the second identifier included in the valid combination, a single identifier remains, the determination unit 208 determines (specifies) that the remaining identifier as an invalid identifier. In the present embodiment, for example, regarding the first identifiers (120, 140) and the second identifier (130) included in the combination No. 4, the identifiers 120 and 130 are identifiers that are also included in combination No. 6 that is a valid combination, and have already been determined as valid (normal) identifiers. Accordingly the identifier 140 corresponds to the remaining single identifier as a result of excluding the identifiers determined as valid (normal). In other words, due to the identifier 140 being invalid, the difference between the determination data and the second data with the second identifier in the combination No. 4 is not within a predetermined value, and thus the combination No. 4 is specified as an invalid combination.

If, as a result of excluding the identifiers already determined as valid (normal) from the invalid combinations, a single identifier remains, the determination unit 208 determines that the remaining identifier is an invalid identifier and that the data including the invalid identifier is invalid data. In this manner, the determination unit 208 can efficiently determine whether the first data or the second data of identifiers included in the invalid combinations is invalid, based on the plurality of identifiers included in the valid combinations.

The determination unit 208 performs loop processing by outputting, to the determination data deriving unit 205, information regarding the invalid combinations and the identifiers determined as invalid. In other words, the information regarding the invalid combinations and the identifiers determined as invalid is returned from the determination unit 208 to the determination data deriving unit 205, and processing for deriving the determination data is performed again by the determination data deriving unit 205.

The determination data deriving unit 205 obtains the information regarding the invalid combinations and the identifiers determined as invalid that is output from the determination unit 208. The determination data deriving unit 205 derives, for each invalid combination, the determination data based on the first data that includes the first identifiers excluding the identifiers already determined as invalid from the plurality of first identifiers of the invalid combination.

In the present embodiment, for example, in the first identifiers (110, 140) included in the combination No. 8, the identifier 140 has been already determined as an invalid identifier, and the determination data deriving unit 205 derives the determination data based on the first identifiers excluding the invalid identifier (140). In this manner, on the basis of the first data with the first identifiers excluding the identifier already determined as invalid, it is possible to derive the determination data for which the difference from the second data with the second identifier is likely to fall within a predetermined value.

The comparison unit 206, the specification unit 207 and the determination unit 208 perform the same processing as the previous processing, based on the determination data that is derived again by the determination data deriving unit 205, and determine whether the first identifiers excluding the identifier determined as invalid and the second identifier are valid, for each invalid combination. The comparison unit 206 compares the determination data derived based on the first identifiers excluding the identifier determined as invalid with the second data with the second identifier, and outputs, to the determination unit 208, information regarding the difference, such as whether the difference between the determination data and the second data with the second identifier is within a predetermined value, as the comparison result.

If the difference between the determination data and the second data with the second identifier is within a predetermined value, such as in the case where the determination data derived based on the first identifiers excluding the identifier determined as invalid matches the second data with the second identifier, the determination unit 208 determines that the first identifiers excluding the identifier determined as invalid and the second identifier are valid identifiers, and the data including the valid identifiers is valid data. By recursively repeating such determination processing in this manner, the determination unit 208 continues to add the identifiers determined as valid, and can increase the number of the valid identifiers, that is, the reliable identifiers. When the identifiers determined as valid are excluded again from the invalid combination and a single identifier remains, the determination unit 208 determines that the remaining identifier is an invalid identifier, and the data including the invalid identifier is invalid data. By repeating this processing on the data with all the identifiers included in the plurality of combinations, the determination unit 208 and the like determine, for all the identifiers, whether the identifiers are valid.

The determination unit 208 outputs information regarding the results of determination of the identifiers to the display device 5. By outputting the information regarding the results of determination to the display device 5, the determination device 208 can notify the fact that the data with any identifier has been subjected to an attack and becomes invalid (abnormal), to the operator of the vehicle C, for example. The determination unit 208 outputs, to the relay processing unit 203, information regarding any identifiers determined as invalid, or a signal (relay prohibiting signal) for prohibiting relay of data with an identifier determined as invalid. By outputting the relay prohibiting signal or the like to the relay processing unit 203, the determination unit 208 can prohibit relay of the data with an identifier that has been subjected to an attack and become invalid (abnormal), and perform defensive processing against invalid data.

In the above description, the data classification unit 204, the determination data deriving unit 205, the comparison unit 206, the specification unit 207, and the determination unit 208 are functional units in the control unit 20 of the determination device 2, but there is no limitation to this. Part of these functional units may also be configured as one functional unit of a cloud server, such as the external server S1 connected to the determination device 2 so that they can communicate with each other or a vehicle computer mounted in the vehicle C, and the determination device 2 may also cooperate with the external server S1, the vehicle computer or the like, to perform a series of processing performed by these functional units.

Figure 6:
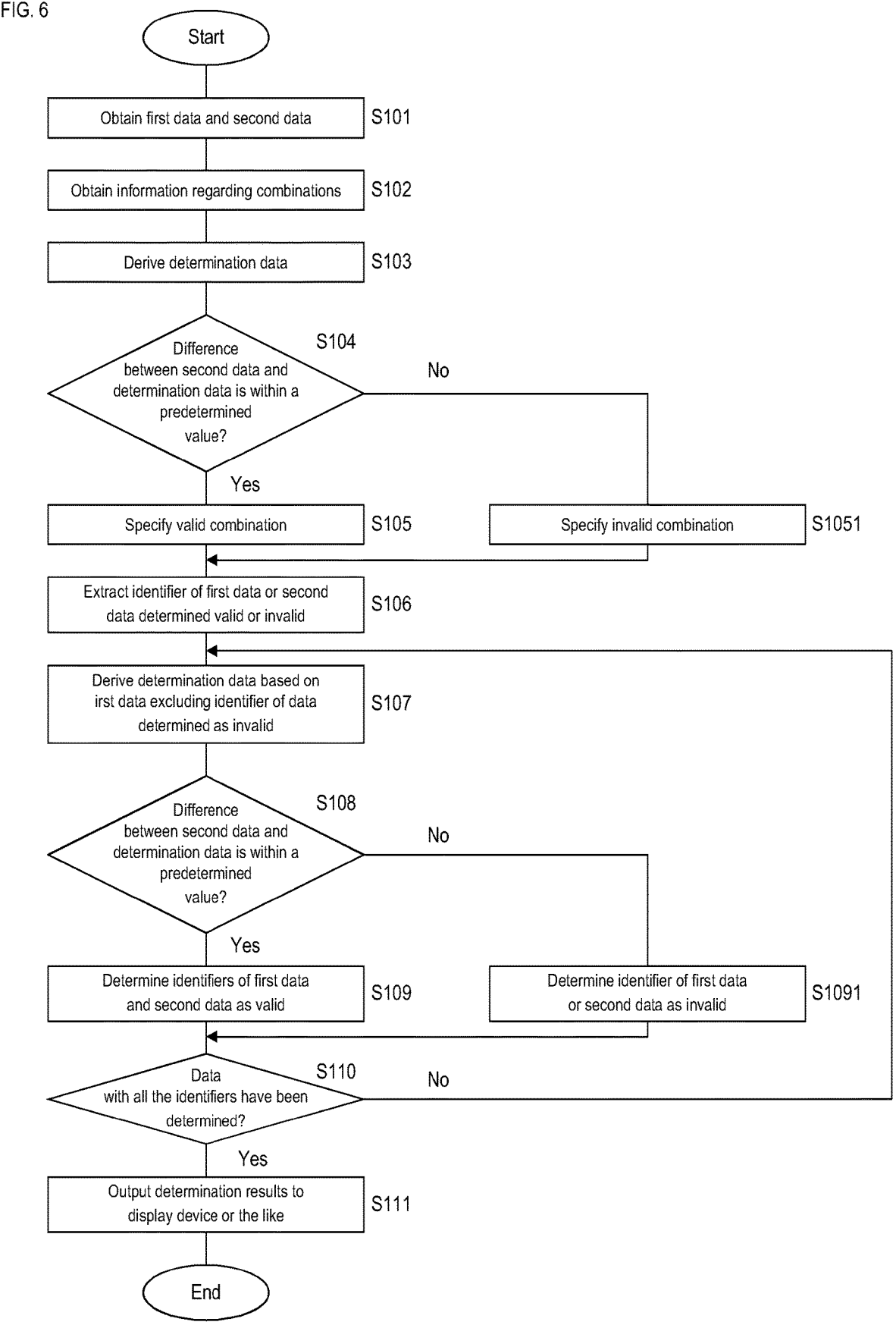
FIG. 6 is a flowchart showing exemplary processing performed by the control unit of the determination device.

FIG. 6 is a flowchart illustrating processing performed by the control unit 20 of the determination device 2. The control unit 20 of the determination device 2 constantly performs the following processing in an activated state (when the IG switch is ON) or a stopped state (when the IG switch is OFF) of a vehicle CC.

The control unit 20 of the determination device 2 obtains a plurality of pieces of data (first data and second data) transmitted from the vehicle-mounted ECUs 3 (S101). The control unit 20 obtains the plurality of pieces of data transmitted from the vehicle-mounted ECUs 3. The data obtained by the control unit 20 is data classified as first data with a first identifier or second data with a second identifier included in individual combinations, in accordance with a plurality of combinations of the identifiers. Accordingly, the data obtained by the control unit 20 includes the first data and the second data of various combination.

The control unit 20 of the determination device 2 obtains information regarding a plurality of combinations of the identifiers for specifying the first data and the second data (S102). The control unit 20 references the storage unit 21 and obtains information regarding the plurality of combinations stored in the storage unit 21. The information regarding the plurality of combinations is stored in a predetermined storage area which can be accessed by the control unit 20 of the determination device 2, such as the storage unit 21 of the external server S1, and the control unit 20 may also obtain the information regarding the plurality of combinations from the external server S1 by communicating with the external server S1 via the external communication device 1.

The control unit 20 of the determination device 2 derives the determination data corresponding to the second data for each combination, based on the first data in each combination (S103). The control unit 20 derives the determination data based on the first data with the first identifiers included in each combination of the plurality of combinations. The control unit 20 extracts the identifiers such as the CAN-IDs or the like included in the obtained data, and specifies, as the first data, the data for which the extracted identifier is the same as the first identifier included in the combination. The control unit 20 extracts the identifiers such as the CAN-IDs or the like included in the obtained data, and specifies, as the second data, the data for which the extracted identifier is the same as the second identifier included in the combination.

Since the combinations each include the plurality of first identifiers, the control unit 20 specifies the plurality of pieces of first data based on the plurality of first identifiers. The control unit 20 inputs the specified plurality of pieces of first data to a transform function or the like, for example, and derives the determination data corresponding to the second data. The control unit 20 derives the determination data corresponding to the second data for each of the combinations.

The control unit 20 of the determination device 2 determines whether the difference between the second data and the determination data is within a predetermined value, for each of the combinations (S104). The control unit 20 determines whether the second data matches the determination data, or whether the difference between the second data and the determination data is within a predetermined value, for each of the combinations. A predetermined value is a threshold for determining that the determination data and the second data have substantially the same value with respect to the accuracy of determination processing performed by the determination device 2 when comparing the determination data with the second data. Alternatively, the control unit 20 may also use the degree of coincidence (matching degree) of the determination data and the second data as the reference, and if the degree of coincidence is a predetermined value or more, the control unit 20 may determine that the determination data and the second data have substantially the same value.

If the difference is a predetermined value or less (S104: YES), the control unit 20 of the determination device 2 specifies a valid combination that includes the identifiers of the valid first data and second data (S105). If the difference is a predetermined value or less, the control unit 20 specifies, as the valid combination, the first identifiers that indicate the plurality of pieces of first data, that are the source data of the determination data, and the second identifier that indicates the second data. In other words, it is determined that the first identifiers and the second identifier included in the valid combination are valid identifiers and the data including the valid identifiers is valid data.

If the difference is not a predetermined value or less (S104: NO), that is, if the difference is greater than the predetermined value, the control unit 20 of the determination device 2 specifies the invalid combination including the identifier of the invalid first data or second data (S1051). If the difference is greater than the predetermined value, the control unit 20 specifies, as the invalid combination, the combination including the first identifiers that indicate the plurality of pieces of first data, that are the source data of the determination data, and the second identifier that indicates the second data. In other words, it is determined that the first identifier or the second identifier included in the invalid combination is invalid identifiers, and the data including the invalid identifier is invalid data.

The control unit 20 of the determination device 2 extracts the identifiers of the first data or the second data that are determined as valid or invalid (S106). The control unit 20 determines (specifies) that the identifiers indicating the first data and the second data included in the valid combination are valid identifiers, and extract the identifiers. If a single identifier remains as a result of excluding the identifiers already determined as normal from the identifiers indicating the first data and the second data included in the invalid combination, the control unit 20 determines (specifies) the remaining identifier as the invalid identifier, and extracts the identifier. Accordingly the control unit 20 can determine the identifier of the first data or the second data that is included in the specified invalid combination, based on the plurality of identifiers included in the valid combination, and extracts the identifier.

The control unit 20 of the determination device 2 derives the determination data based on the first data excluding the identifier of the data determined as invalid in the other invalid combination from the identifiers of the plurality of pieces of first data included in the invalid combination (S107). The control unit 20 again derives the determination data, based on the data that include the first identifiers excluding the identifier already determined as invalid from the first identifiers of the invalid combinations, for each invalid combination. Based on the first identifiers excluding the identifier already determined as invalid, the control unit 20 can derive the determination data for which the difference from the data with the second identifier is likely within a predetermined value.

The control unit 20 of the determination device 2 determines whether the difference between the second data included in the invalid combination and the derived determination data is within a predetermined value (S108). Similarly to the above processing of S104, the control unit 20 compares the second data included in the invalid combination with the determination data derived based on the data of the first identifiers excluding the identifier already determines as invalid, and determines whether the difference between the second data and the determination data is within a predetermined value.

If the difference is a predetermined value or smaller (S108: YES), the control unit 20 of the determination device 2 determines that the identifiers of the first data and the second data are valid (S109). For each invalid combination, the control unit 20 determines that the first identifiers excluding the identifier already determined as invalid and the second identifier are valid identifiers, and the data including the valid identifiers is valid data. By recursively repeating such determination processing, the control unit 20 can continue to add the identifiers determined as valid and increase the number of the valid identifiers, in other words, the reliable identifiers.

If the difference is not a predetermined value or smaller (S108:NO), in other words, if the difference is greater than the predetermined value, the control unit 20 of the determination device 2 determines that the identifiers of the first data and the second data are invalid (S1091). For each invalid combination, the control unit 20 determines that any of the first identifiers excluding the identifier already determined as invalid and the second identifier is an invalid identifier, and the data with the invalid identifier is invalid data.

The control unit 20 of the determination device 2 determines whether all the identifiers have been determined (S110). The control unit 20 stores, in the storage unit 21, the results of determination of the validity of the data of all the identifiers included in the combinations, and determines whether all the identifiers have been determined by referencing the results of determination.

If all the identifiers have not been determined (S110: NO), the control unit performs loop processing from S107 to S110 by executing the processing from S107 again. By recursively repeating such determination processing of S107, S108 and so on, the control unit 20 can continue to add the identifiers determined as valid and increase the number of the valid identifiers, in other words, the reliable identifiers. If a single identifier remains as a result of excluding identifiers determined as valid from each invalid combination, the control unit 20 determines that the remaining identifier is an invalid identifier, and thus can reliably specify the invalid identifier and increase the number of the specified invalid identifiers.

If all the identifiers have been determined (S110: YES), the control unit 20 outputs the results of determination to the display device 5 or the like (S111). By outputting the information regarding the results of determination the display device 5 or the like, in the plurality of identifiers correlated with each other, for example, whether the individual identifier is valid, or the fact that the data with any identifier has been subjected to an attack and become invalid (abnormal) can be notified to the operator of the vehicle C. The control unit 20 may also output, to the relay processing unit 203, a signal (relay prohibiting signal) for prohibiting relay of data of the identifier determined as invalid. By outputting the relay prohibiting signal or the like to the relay processing unit 203, it is possible to prohibit relay of data of the identifier that has been subjected to an attack and become invalid (abnormal) and perform defensive processing against the attack using the invalid data.

According to the present embodiment, the determination device 2 determines which of the first data or the second data of the identifier included in the invalid combination is invalid, based on the first data with the first identifiers and the second data with the second identifier included in the specified invalid combination, and the first data of the first identifiers and the second data of the second identifier included in the specified valid combination. Accordingly, in the pieces of data including the plurality of identifiers correlated with each other, even if any data has been subjected to an attack, the identifier of the data that has become invalid due to the attack can be specified.

According to the present embodiment, each combination is constituted by a dataset formed by the plurality of first identifiers respectively indicating the plurality of pieces of first data and the second identifier indicating a single second data, and the same identifier is redundantly included in two or more combinations. The combinations can be linked and correlated with each other based on any identifier, and determination of the first identifiers and the second identifier included in the other combinations can be efficiently performed, using the first identifiers or the second identifier of the second data included in the combination determined as a valid combination.

According to the present embodiment, in the first identifiers included in any one of the invalid combinations, the determination data is derived again based on the first data with the first identifiers excluding the identifier determined as invalid in the other invalid combinations. Then, the determination device 2 repeatedly execute processing for determining whether the first identifiers excluding the identifier of the data determined as invalid and the second identifier are valid, based on the difference between the derived determination data and the second data with the second identifier included in that invalid combination. Accordingly determination of whether all the identifiers included in each of the combinations are valid can be efficiently performed, and the identifier that is invalid can be specified from among the plurality of identifiers that are correlated with each other.

It should be appreciated that the embodiments disclosed herein are to be construed in all respects as illustrative and not limiting. The scope of the present disclosure is defined by the claims, rather than by the description preceding them, and is intended to include all modifications which fall within the scope of the claims and the meaning and scope of equivalents thereof.

The invention claimed is:

1. A determination device that is mounted in a vehicle and connected to a plurality of vehicle-mounted ECUs so that they can communicate with the determination device, the determination device comprising:
a control unit configured to perform control regarding determination of whether data transmitted from the plurality of vehicle-mounted ECUs is valid,
wherein the data includes first data and second data, and the control unit is configured to:
obtain a plurality of pieces of the first data and the second data that are transmitted from the plurality of vehicle-mounted ECUs;
derives determination data based on the first data; and
specify, from among a plurality of combinations of identifiers for identifying the first data and identifiers for identifying the second data, valid combinations including identifiers of valid first data and second data and invalid combinations including identifiers of invalid first data or second data, based on the second data and the determination data, and
determine, based on the plurality of identifiers included in the specified invalid combinations and the plurality of identifiers included in the valid combinations, whether the first data or the second data of any identifier included in the specified invalid combinations is invalid so as to determine each of the plurality of vehicle-mounted ECUs has been affected by an unauthorized message.

2. The determination device according to claim 1, wherein each of the plurality of combinations includes a plurality of identifiers for respectively identifying a plurality of pieces of the first data and an identifier of the second data, and
the same identifier is redundantly included in two or more of the combinations.

3. The determination device according to claim 1, wherein, if a difference between determination data derived based on first data with an identifier included in one of the plurality of combinations and second data with an identifier included in that one combination is within a predetermined value, then the control unit specifies that the one combination is a valid combination.

4. The determination device according to claim 3, wherein, if a difference between determination data derived based on the first data with an identifier included in one of the plurality of combinations and the second data with an identifier included in that one combination is greater than a predetermined value, the control unit specifies that the one combination is an invalid combination.

5. The determination device according to claim 1, wherein, from among the identifiers included in the invalid combination, the control unit determines that the first data or the second data with an identifier that is different from the identifier included in the valid determination combination is invalid data.

6. The determination device according to claim 5, wherein, in identifiers of the plurality of first data included in the invalid combinations, the control unit is configured to:
derive the determination data based on the first data with identifiers excluding any identifier of data determined as invalid in another invalid combination, and
determine whether the first data and the second data included in the invalid combination is valid, based on the determination data and the second data with an identifier included in the invalid combination.

7. The determination device according to claim 1, wherein information regarding a plurality of combinations is stored in a predetermined storage area which is accessible from the determination device, and
the control unit obtains the information regarding the plurality of combinations by referencing the predetermined storage area.

8. The determination device according to claim 1, wherein the first data and the second data corresponding to the identifiers constituting the combination are correlated with each other, and
an absolute value of a correlation coefficient of the first data and the second data is at least 0.7.

9. A determination program for causing a computer to execute processing for:
obtaining a plurality of pieces of a first data and a second data that are transmitted from a plurality of vehicle-mounted ECUs;
deriving determination data based on the first data;
obtaining information regarding a plurality of combination of identifiers for identifying the first data and second data;
specifying, from among a plurality of combinations, valid combinations including identifiers of valid first data and second data and invalid combinations including identifiers of invalid first data or second data, based on the obtained second data and the determination data, and
determining, based on the plurality of identifiers included in the specified invalid combinations and the plurality of identifiers included in the valid combinations, whether the first data or the second data of any identifier included in the specified invalid combination is invalid so as to determine each of the plurality of vehicle-mounted ECUs has been affected by an unauthorized message.

10. A determination method for causing a computer to execute processing for:
obtaining a plurality of pieces of a first data and a second data that are transmitted from a plurality of vehicle-mounted ECUs;

deriving determination data based on the first data;
obtaining information regarding a plurality of combination of identifiers for identifying the first data and second data;
specifying, from among a plurality of combinations, valid combinations including identifiers of valid first data and second data and invalid combinations including identifiers of invalid first data or second data, based on the obtained second data and the determination data, and
determining, based on the plurality of identifiers included in the specified invalid combinations and the plurality of identifiers included in the valid combinations, whether the first data or the second data of any identifier included in the specified invalid combination is invalid, so as to determine each of the plurality of vehicle-mounted ECUs has been affected by an unauthorized message.

* * * * *